April 13, 1965 W. RIEHL 3,177,993
CONTROL APPARATUS FOR A MOTOR VEHICLE CLUTCH
Filed Feb. 19, 1962 2 Sheets-Sheet 1

Inventor
BY Wilhelm Riehl
George A. Schmidt
Attorney

April 13, 1965  W. RIEHL  3,177,993
CONTROL APPARATUS FOR A MOTOR VEHICLE CLUTCH
Filed Feb. 19, 1962  2 Sheets-Sheet 2

Inventor
BY *Wilhelm Riehl*
*George A. Schmidt*
Attorney 3,177,993
CONTROL APPARATUS FOR A MOTOR
VEHICLE CLUTCH
Wilhelm Riehl, Raunheim (Main), Germany, assignor to General Motors Corporation, Detroit, Mich., a corporation of Delaware
Filed Feb. 19, 1962, Ser. No. 174,073
Claims priority, application Germany, Feb. 25, 1961, O 7,905
9 Claims. (Cl. 192—3.5)

This invention relates to automatic motor vehicle clutches. In such clutches, the clutch is disengaged automatically when a gear ratio is shifted or the vehicle is stationary. The present invention is concerned with a control apparatus for controlling the engagement and disengagement of the clutch.

If the clutch is disengaged whenever the engine speed is below a certain value, the engine speed may fall below this value when high gear is engaged and the vehicle is coasting down a hill; this is of course undesirable. If on the other hand the clutch is disengaged whenever the vehicle speed is below a certain value, it would be impossible to start the vehicle.

The control apparatus according to this invention has a control device responsive to engine speed, for example engine oil pressure, vehicle speed and movement of the gear shift lever or element and operative to disengage the clutch either when the lever or element is moved or when engine speed and vehicle speed are simultaneously below certain values respectively. Thus when engine speed is low and vehicle speed is relatively high, for example coasting down a hill in high gear, the clutch remains engaged; and when vehicle speed is zero and the engine is accelerated the clutch is engaged to enable the vehicle to start.

Figure 1:
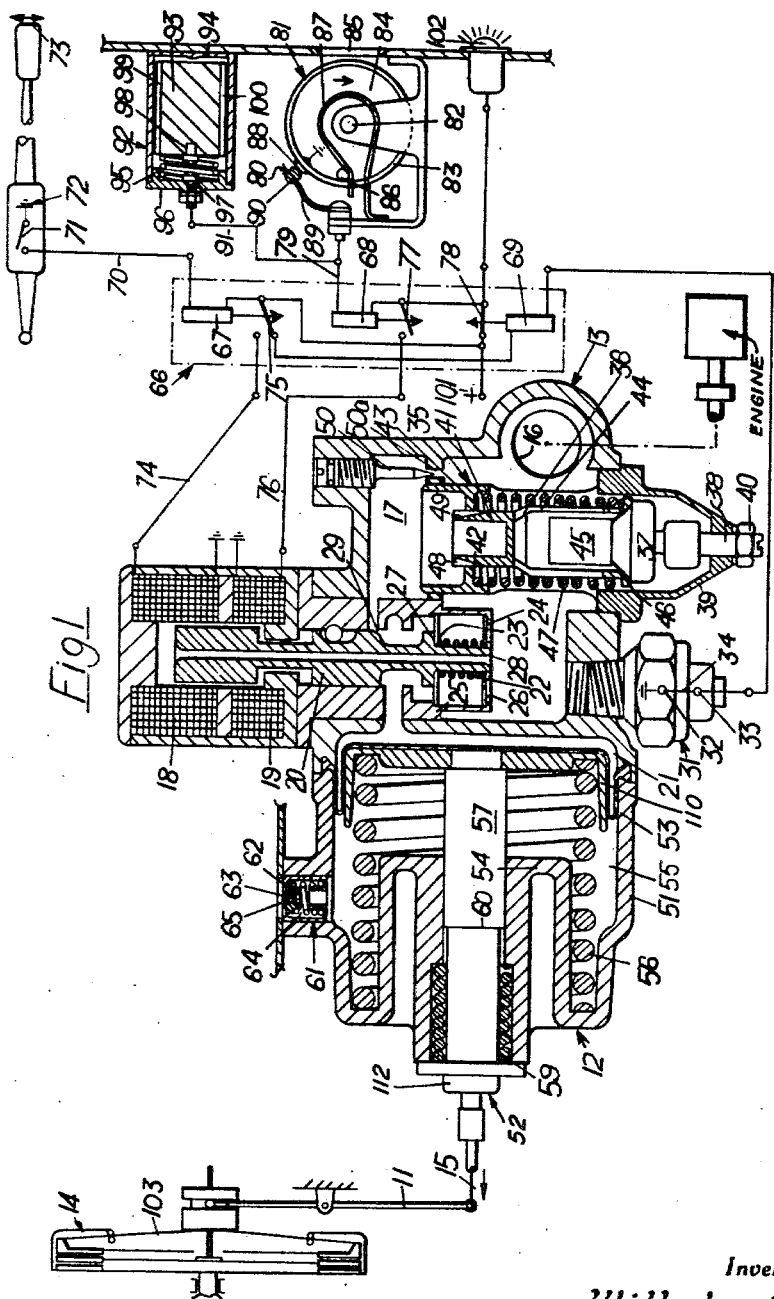
FIGURE 1 is a section through a control apparatus for a clutch, which is shown diagrammatically, a control device forming part of the apparatus being shown diagrammatically.

A conventional clutch 14 is biassed by clutch springs (not shown) towards an engaged position by a force which first increases and then decreases with movement of the friction elements towards fixed friction elements. The friction elements are moved by an actuator member 52 which is connected by a cable 15, and lever 11 and plate spring 103 to the movable friction elements and which is part of a fluid motor 12.

The motor 12 is operated by engine oil whose pressure varies with engine speed. The oil enters a housing 13 at an inlet 16, and leaves the housing by an outlet 17.

Control valve 20, which is mounted in the housing 13, controls the application of oil to the actuator member 52 and the flow of oil to the exhaust 17. In a first position (illustrated) of the piston valve member of the valve 20 a restricted aperture 29 between the inlet and outlet is open; in a second position (upper position), the inlet 16 is isolated from the outlet 17 and the size of the aperture 29 is increased; and in a third (bottom) position the aperture 29 is blocked and the inlet 16 is connected to the chamber 21 of the fluid motor.

The valve member 20 is biassed towards the first or centre position by a spring 22, which is compressed between two perforated discs 23 and 24. The discs engage shoulders 25 and 26 in the housing wall and lands 27 and 28 on the valve member. When the valve member is moved, the spring 22 is further compressed which therefore creates a restoring force.

A pressure switch 31 having contacts 32, 33 is fitted in housing 13. This switch opens above a certain engine oil pressure and closes below this pressure. The switch contacts 32, 33 and the switch lever 34 are indicated schematically.

A thermo-responsive valve 35 is fitted in parallel with the control valve 20 between the inlet 16 and the outlet 17 to prevent changes in oil viscosity from having any effect on clutch operation. The valve 35 comprises a piston 36 and an expansion element 37. The expansion element 37 is secured to the housing 13 by a threaded pin 38 screwed into a conical extension 39 of the housing and locked by a nut 40. The smaller diameter portion 41 of the piston 36 projects into an aperture 42 of a partition wall 43 between the inlet 16 and exhaust 17; and its larger diameter portion 44 accommodates a cylindrical part 45 of the expansion element 37. A compression spring 47 is compressed between a flange 46 of the control piston 36 and the partition wall 43, and forces the control piston 36 downwardly. When the temperature rises, the expansion element 37 moves the control piston 36 against the compression spring 47 further into the aperture 42 and vice versa. The front portion of the control piston 36 has slots 48, 49, the depth of the slots decreasing towards the expansion element. The further the control piston 36 is introduced into the aperture 42, the less becomes the cross-section of the aperture 42.

The oil pressure supplied to the fluid motor may be adjusted over the entire range of speeds by an externally operable valve member 50, which controls an aperture in the partition 42 and which is in parallel with the control valve 20.

The motor 12 comprises a cylinder 51 in which the actuating member, illustrated generally by the numeral 52, is located. Actuator member 52 includes a head 110 receiving rod 57 and against which a diaphragm 53 is adapted to act. Rod 57 has a flange 112 formed at the opposite end thereof to receive a spring 59, the purpose for which will be hereinafter described. Rod 57 is suitably connected to cable 15. The member 52 is sealed to the cylinder wall by a diaphragm 53 which is clamped at the joint between parts of the housing 13. A re-entrant portion 54 of the housing forms a guide for the rod 57 of the member 52.

The actuating member is biassed towards the illustrated position by biassing means which comprises opposed springs 56 and 59. The spring 56, which is the main spring, biasses the actuating member to the right and its bias of course increases as the member is forced by oil pressure to the left; the spring 59, which is the secondary spring, however biasses the actuating member to the left by acting between the flange 112 and the re-entrant portion 54. At an intermediate position of the actuating member spring 59 becomes ineffective—that is it is no longer strained. In order to prevent the secondary spring 59 from rattling, it engages a shoulder 60 of the piston rod 57 before the strain is completely removed.

A relief valve 61 connects the air space 55 at the rear of the actuating member 52 to the oil sump of the engine. It comprises a valve plate 62 having a restriction 63, the plate being forced by a spring 64 against an opening 65. When the actuating member 52 is moved to the left to engage the clutch the air in the space 55 is forced through the restriction 63 and the resulting air cushion acts like a shock absorber to minimize the chances of jerky engagement of the clutch. When the actuating member moves to the right air is drawn into the space 55, the valve plate 62 being lifted iff its seat against the spring 64 so that movement of the actuating member is not retarded by a partial vacuum.

The valve member of the control valve 20 is controlled by two electro-magnetic coils or solenoids 18 and 19. When the coil 18 is energised the valve member is moved to its second or upper position; when the coil 19 is energised the valve member is moved to its third or bottom position; and when the coils are both deenergised it is moved by its resilient bias into its center or first position.

The energisation of the coils 18 and 19 is controlled by a control device which comprises a relay assembly 66 having three relays 67, 68 and 69. The coil of the relay 67 is connected via a line 70 with a switch 71 in the gearshift lever 72; the switch 71 is such that it closes the circuit for the coil 67 when the gearshift lever 72 is moved in a direction of the arrows 73 to change gear.

The coil 18 is provided with current by a lead 74 when the switch member 75 of the relay 67 is moved by the coil 67 (the switch member is shown in the position it assumes when the coil 67 is deenergized). The coil 19 receives current via a lead 76 when the switch member 77 of the relay 68 and the switch member 78 of the relay 69 are closed: the switch member 77 is closed when the relay 68 is deenergised; and the switch member 78 is closed when the relay 69 is energised.

The coil 68 is connected by a lead 79 to the switch 80 of a drum type speedometer 81. The cylinder 83 mounted rotatably on a spindle 82 rotates in the direction of the arrow 84 as the speed increases, and is rotated in the opposite direction by a spring (not shown) as the speed falls. In the speed range between 3 m.p.h. forwards and reverse, a pin 86 secured to the cylinder 83 engages one end of a stop spring 87, the other end of the spring 87 being secured in the casing of the speedometer. The spring 87 enables the cylinder 83 to rotate in the opposite direction to the arrow 84 when the vehicle is travelling in reverse. The switch 80 comprises an earthed contact 88 secured to the cylinder 83 and a contact 90 attached to a thin leaf spring 89. When the vehicle is stationary or travelling at a speed less than 3 m.p.h. forward or in reverse, the switch 80 is closed: at other speeds it is open.

An inerta switch 92 is connected in parallel with the switch 80. The switch 92 comprises a solid cylinder 93 slideable in a sleeve 94 mounted in the instrument panel. The cylinder is biased towards the position shown by a spring 95. A contact 97 is secured in the cover 96 of the sleeve and co-operates with a contact 98 fixed to the cylinder 93. The switch 92 is so adjusted that the two contacts 97 and 98 contact only when there is a braking retardation of more than $0.2g$. In order to damp the movement and reduce friction of the cylinder the sleeve inner space is filled with liquid, the spaces at both sides of the cylinder 93 being connected with each other through passages 99 and 100.

The coil of the relay 69 is connected in series with the oil-pressure switch 31. A supply terminal 101 is connected to one terminal of the switch member 78 and to one terminal of the switch member 75.

Figure 3:
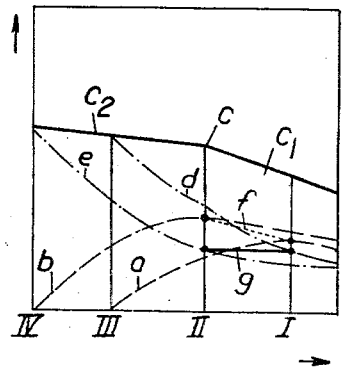
FIGURE 3 is a graph in which the ordinate represents force, and the abscissa movement of the actuator member of the control apparatus.

In the graph shown in FIGURE 3, the following curves are plotted.

CURVE (a) The force exerted by clutch springs (not shown) tending to engage the clutch when the clutch linings are new;

(b) The same curve as $a$ except that the clutch linings are worn;

(c) The actuator member-force characteristic of the springs 56, 59 tending to disengage the clutch;

(d) The force which engine oil pressure must exert in conjuction with the force of the clutch springs (curve $a$) to overcome the force of the springs 56, 59, the clutch lining being new;

(e) The same as curved $d$, except that the clutch lining is worn.

In order to move the actuating member 52 the oil pressure must exert a force such that together with the force of the clutch springs (curves $a$ or $b$) it overcomes the force of the springs 56, 59. On the abscissa I represents initial engagement of the clutch with a new lining; II initial engagement of the clutch with a worn lining; III full engagement of the clutch with a new lining; and IV full engagement of the clutch with a worn lining.

By comparing the curves $a$ and $b$ it can be seen that the force of the clutch springs tending to engage the clutch at the point of initial clutch engagement is greater with a worn lining than with a new lining; and for partially worn linings the force of the clutch springs at this stage lies between the force exerted with new and worn linings. In fact as the lining becomes worn the force exerted by the clutch springs at the instant of clutch engagement increases rectilinearly as indicated by the dotted line $f$.

The characteristic $c_1$ of the springs 56, 59 is the characteristic of the resultant of the springs and is parallel with the line $f$; therefore the oil pressure (line $g$) necessary for applying the clutch remains constant within the region of possible lining wear conditions so that the clutch does not have to be re-adjusted. The flatter characteristic $c_2$ is the characteristic of the spring 56 by itself so that the difference in the oil pressure necessary to fully engage the clutch in the positions III and IV is small and represents a very small difference in engine speed.

Figure 2:
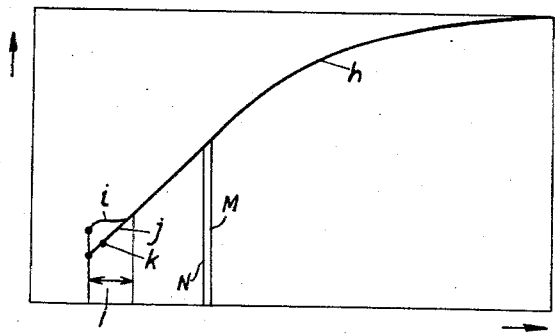
FIGURE 2 is a graph in which the ordinate represents oil pressure and the abscissa engine speed.

The curve in FIGURE 2 shows the course of the oil pressure with respect to the engine r.p.m. In the slow engine speed range, the curve $h$ has two branches $i$ and $j$, depending on whether the restricted aperture 29 is opened or closed. The pressure for initial clutch engagement is attained at $k$. The engine speed necessary to fully engage the clutch with a new lining and a worn lining is represented by the lines N and M respectively. In the slow speed range $l$, the oil pressure when the aperture 29 is open falls below that necessary to engage the clutch at the point $k$; with the aperture 29 closed, the pressure does not fall below the value necessary to keep the clutch engaged (branch $i$).

OPERATION

*Starting*

The clutch 14, actuating member 52, and valve 20 are in the indicated positions, and the oil-pressure switch 31 is closed. The relay coil 69 is therefore energised through the switch member 75 of the relay 67 and consequently closes its switch member 78 to switch on a warning lamp 102.

When the shift lever 72 is moved the switch 71 is closed so that the relay coil 67 is energised to move the switch member 75 away from the illustrated position so as to energise the coil 18. The coil 18 moves the valve member of the valve 20 into its second or upper position to block the inlet 16 from the space 21 and to connect the space 21 to the exhaust 17. This prevents the clutch from being engaged when a gear is being engaged. After release of the shift lever 72, the original condition is restored. When the driver accelerates, the oil pressure gradually rises along line $h$ (FIGURE 2) and attains the application pressure at $k$ (FIGURE 2). With increasing oil pressure, the actuating member 52 is pushed further towards the left until the clutch 14 is fully engaged.

When a certain oil pressure is exceeded, the switch 31 opens, with the result that the relay 69 becomes dead and the warning lamp 102 is extinguished; when the vehicle has reached a speed of above 3 m.p.h., the contacts 88 and 90 in the speedometer are opened.

*Gear-change during driving*

When the shift lever 72 is moved, the switch 71 is closed, so that a current flows through relay 67. The switch member of the relay 67 therefore moves to energise the coil 18. This moves the valve member of the valve 20 into its second or upper position to disengage the clutch. After the gearshift lever 72 has been released, the original control condition is re-established and the clutch 14 is gently engaged when the car is accelerated.

*Vehicle coasting with the throttle in the closed position and high gear engaged*

The switch 80 in the speedometer 81 is open and consequently the switch member 77 is closed. When the engine revolutions fall to a certain value, the pressure switch 31 is closed. This energises the coil of the relay 69 and moves the switch member 78 to the illustrated position. The coil 19 is therefore energised and the valve member of the valve 20 is moved to its third or lower position in which the restricted aperture 29 is closed. The oil pressure applied to the actuating member 52 now follows the branch *i* (FIGURE 2) with the result that the engine remains lightly clutched in. If however, the vehicle speed now drops below 3 m.p.h. the contacts 80 close to energise the coil of the relay 68 to open the switch member 77 and thereby deenergise the coil 19; when this occurs the valve member of the valve 20 returns to its intermediate or first position in which the aperture 29 is open. Consequently, the oil pressure drops to the lower branch *j* of the oil-pressure curve *h* and the engine is de-clutched so that the vehicle comes to a standstill.

*Severe braking*

Under severe retardation, the solid cylinder 93 in the inertia switch 92 is hurled forward and overcomes the spring 95; the two contacts 97 and 98 are thereupon closed. Since this switch is in parallel with the switch 80 in the speedometer, the effect is the same as the vehicle travelling at a speed of between ±3 m.p.h. This prevents stalling of the engine.

If however the retardation is less than 0.2 g. for example downhill descent held in check by foot braking) the clutch remains engaged as the risk of stalling does not exist in this case.

I claim:
1. An automatic clutch for a motor vehicle which is adapted to disengage either when a gear ratio is being shifted by a manual shift element or when the vehicle is stopped and which comprises:
   (a) interengageable friction elements;
   (b) an actuator member movable to engage and disengage said friction elements;
      (1) a housing for movably supporting said actuator member;
   (c) resilient means biasing said actuator member towards a position in which said friction elements are disengaged;
   (d) means for connecting oil under pressure from the engine of said motor vehicle to said actuator member;
   (e) a valve having a valve member operated to control the application and exhaust of engine oil pressure respectively to and from said actuator member respectively to move said actuator member against said resilient means or to permit said resilient means to move said member;
   (f) a valve control device, including solenoid means, responsive to engine oil pressure, vehicle speed and movement of said gear shift element and operative to move said valve member so that said resilient means moves said actuator member whenever either said shift element is moved or engine speed and vehicle speed are simultaneously below certain values respectively; and
   (g) means responsive to engine oil temperature and operative to counteract changes in oil viscosity whereby oil pressure applied to said actuator member is independent of the temperature of said oil.

2. In a motor vehicle having a clutch; a control apparatus for said clutch adapted to disengage the clutch either when a gear ratio is being shifted by a manual shift element or when the vehicle is stopped, said control apparatus including:
   (a) a housing for said control apparatus;
   (b) a source for providing oil under pressure and means for operatively connecting said oil to said control apparatus for controlling movement thereof;
   (c) means for operatively connecting said control apparatus to said clutch for controlling engagement and disengagement of said clutch;
   (d) an actuator member operatively connected to said clutch and movably mounted in said housing and responsive to said pressure for engaging and disengaging said clutch;
   (e) resilient means biasing said actuator member towards a position to disengage said clutch; and
   (f) control means responsive to engine speed, vehicle speed, vehicle retardation above a certain value and movement of said shift element and operatively connected to said control apparatus for controlling the application of said oil pressure to said actuator member to disengage said clutch whenever firstly said shift element is moved, or secondly engine speed and vehicle speed are simultaneously below certain values respectively, or thirdly engine speed and vehicle retardation are simultaneously below and above certain values respectively.

3. In a motor vehicle having an engine and a clutch; a control apparatus for said clutch adapted to disengage the clutch either when a gear ratio is being shifted by a manual shift element or when the vehicle is stopped, said control apparatus including;
   (a) a housing for said control apparatus;
   (b) oil under pressure from the engine of the motor vehicle and means for operatively connecting said oil to said control apparatus for controlling movement thereof;
   (c) an actuator member operatively connected to said clutch and movably mounted in said housing for responding to said pressure for controlling engagement and disengagement of said clutch;
   (d) resilient means biasing said actuator member towards a position to disengage said clutch; and
   (e) a control device including a valve, solenoid means operatively associated with said valve, and solenoid operating means, said solenoid operating means being responsive to engine speeds as represented by engine oil pressure, vehicle speed and movement of said shift element and operative to control said valve so that the amount of engine oil pressure applied to said actuator member results in said resilient means moving said actuator member whenever either said shift element is moved or engine speed and vehicle speed are simultaneously below certain values respectively.

4. In a motor vehicle having an engine and a clutch; a control apparatus for said clutch adapted to disengage the clutch either when a gear ratio is shifted by a manual shift element or when the vehicle is stopped, said control apparatus including;
   (a) a housing;
   (b) oil under pressure from said engine and means for connecting said oil to an inlet of said housing;
   (c) an actuator member movably mounted in said housing, means operably connecting said actuator to said clutch whereby said actuator is movable by engine oil pressure to engage said clutch;
   (d) an engine oil outlet from said housing;
   (e) a control valve located between said inlet and outlet and operative to control the flow of engine oil to and exhaust of engine oil from said actuator member, said control valve having a valve member movable into three positions, said valve member in a first position connecting said inlet to said actuator member and also connecting said actuator member through a restricted aperture to an exhaust, in a second position blocking said inlet from said actuator member and connecting said actuator member to exhaust, and in a third position blocking said exhaust from said actuator member and connecting said inlet to said actuator member; and (f) control means responsive to engine speed, vehicle speed and movement of said shift element and operative to move said valve member to said first position when either said engine oil pressure is above a certain value or said vehicle speed is above a certain value, to said second position when said gear shift element is moved, and to said third position when said engine oil pressure and vehicle speed are simultaneously below and above certain values respectively.

5. In a motor vehicle having an engine and a clutch; a control apparatus for said clutch adapted to disengage the clutch either when a gear ratio is being shifted by a manual shift element or when the vehicle is stopped, said control apparatus including;

(a) a housing;

(b) oil under pressure from said engine and means for connecting said oil to an inlet of said housing;

(c) an actuator member movably mounted in said housing, said actuator member being operably connected to said clutch and movable by engine oil pressure to engage said clutch;

(d) resilient means biasing said actuator member to disengage said clutch;

(e) an engine oil outlet from said housing;

(f) a control valve located between said inlet and outlet and operative to control the flow of engine oil to and exhaust of engine oil from said actuator member, said control valve having a valve member movable into three positions, said valve member in a first position connecting said inlet to said actuator member and also connecting said actuator member through a restricted aperture to an exhaust, in a second position blocking said inlet from said actuator member and connecting said actuator member to exhaust, and in a third position blocking said exhaust from said actuator member and connecting said inlet to said actuator member; and (g) a control device including solenoid operated means responsive to engine speed, vehicle speed and movement of said shift element, said solenoid operated means being operative to move said valve member to said first position when either said engine oil pressure is above a certain value or said vehicle speed is above a certain value, to said second position when said gear shift element is moved, and to said third position when said engine oil pressure and vehicle speed are simultaneously below and above certain values respectively.

6. In a motor vehicle having an engine and a clutch; a control apparatus for said clutch adapted to disengage the clutch either when a gear ratio is being shifted by a manual shift element or when the vehicle is stopped, said control apparatus including;

(a) a housing;

(b) oil under pressure from said engine and means for connecting said oil to an inlet of said housing;

(c) an actuator member movably mounted in said housing, said actuator member being operatively connected to said clutch and movable by engine oil pressure to disengage said clutch;

(d) resilient means biasing said actuator member to disengage said clutch;

(e) an engine oil outlet from said housing;

(f) a control valve located between said inlet and outlet and operative to control the flow of engine oil to and exhaust of engine oil from said actuator member, said control valve having a valve member movable into three positions, said valve member in a first position connecting said inlet to said actuator for member and also connecting said actuator member through a restricted aperture to an exhaust, in a second position blocking said inlet from said actuator member and connecting said actuator member to exhaust, and in a third position blocking said exhaust from said actuator member and connecting said inlet to said actuator member; and (g) a control device having solenoid means controlled by a switch responsive to engine oil pressure, a switch controlled by the shift element, and a switch controlled by a speedometer, said solenoid means being operative to move said valve member to said first position when either said engine oil pressure is above a certain value or said vehicle speed is above a certain value, to said second position when said gear shift element is moved, and to said third position when said engine oil pressure and vehicle speed are simultaneously below and above certain values, respectively.

7. In a motor vehicle having an engine and a clutch; a control apparatus for said clutch adapted to disengage the clutch either when a gear ratio is being shifted by a manual shift element or when the vehicle is stopped, said control apparatus including;

(a) a housing;

(b) oil under pressure from an engine of the motor vehicle and means for connecting said oil to an inlet of said housing;

(c) an actuator member movably mounted in said housing, said actuator member being operatively connected to said clutch and movable by engine oil pressure to disengage said clutch;

(d) resilient means biasing said actuator member to disengage said clutch;

(e) an engine oil outlet from said housing;

(f) a control valve located between said inlet and outlet and operative to control the flow of engine oil to and exhaust of engine oil from said actuator member, said control valve having a valve member movable into three positions, said valve member in a first position connecting said inlet to said actuator member and also connecting said actuator member through a restricted aperture to an exhaust, in a second position blocking said inlet from said actuator member and connecting said actuator member to exhaust, and in a third position blocking said exhaust from said actuator member and connecting said inlet to said actuator member; and (g) solenoid means controlled by a first switch responsive to a certain oil pressure, a second switch controlled by the shift element, a third switch controlled by a speedometer, and a fourth switch controlled by vehicle retardation, said solenoid means being operative to move said valve member to said first position when firstly said engine oil pressure is above a certain value, or secondly said vehicle speed is above a certain value, or thirdly said engine oil pressure is below a certain value, said vehicle speed is above a certain value and vehicle retardation is above a certain value; to said second position when said gear shift element is moved; and to said third position when said engine oil pressure and vehicle speed are simultaneously below and above certain values, respectively.

8. In a motor vehicle having an engine and a clutch; a control apparatus for said clutch, said clutch being resiliently biased towards an engaged position by a force increasing with clutch lining wear and increases and then decreases with movement towards a fully engaged clutch position, said control apparatus including;

(a) a housing;

(b) oil under pressure from an engine of the motor vehicle and means for connecting said oil to an oil inlet at said housing;

(c) an actuator member movably mounted in said housing and operatively connected to the clutch for controlling movement thereof, said actuator being movable by engine oil pressure to engage the clutch;

(d) resilient means biasing said actuator member towards a clutch disengaged position, said resilient means comprising two springs in opposition, one of said springs opposing clutch engagement movement of said actuator member in all positions of said member, and a second of said springs becoming ineffective in an intermediate position of said actuator member, said resilient means having an actuator member force characteristic with a first range providing compensation for increase in clutch bias resulting from clutch lining wear, so that clutch lining wear has no effect on the engine oil pressure required to move said actuator member to initially engage said clutch, and with a second range providing compensation for clutch lining wear, so that only a small increase in pressure is required to fully engage said clutch when said such lining is worn; and (e) control means for controlling the application of oil pressure to said actuator member.

9. In a motor vehicle having an engine and a clutch; a control apparatus for said clutch, said clutch being resiliently biased towards an engaged position by a force increasing with clutch lining wear and increases and decreases with movement towards a fully engaged clutch position, said control apparatus including;

(a) a housing having an oil inlet and an oil outlet;

(b) oil under pressure from an engine of the motor vehicle and means for connecting said oil to said oil inlet;

(c) an actuator member movably mounted in said housing and operably connected to the clutch for controlling movement thereof; said actuator being movable to an extended position by engine oil pressure to fully engage the clutch, and to a retracted position to disengage said clutch;

(d) resilient means biasing said actuator member towards a clutch disengaged position, said resilient means comprising two springs in opposition, one of said springs opposing clutch engagement movement of such actuator member in all positions of said member, and the second of said springs becoming ineffective beyond a position intermediate the extended and retracted positions of said actuator member, the biasing force of said resilient means having an actuator member force characteristic with a first range compensating for clutch bias increases due to clutch lining wear, whereby the biasing force of said resilient means increases at a rate so that wear of said lining has no effect on the engine oil pressure required to move said actuator member to an initial clutch engaging position, and with a second range compensating for clutch bias force increases due to clutch lining wear, whereby the biasing force of said resilient means increases at a rate so that only a small increase in oil pressure is required to fully engage said clutch when the clutch lining is worn from that required when the lining is new;

(e) a control valve located between said inlet and outlet and operative to control the flow of engine oil to and exhaust of engine oil from said actuator member, said valve having a valve member movable into three positions, said valve member in a first position connecting said inlet to said actuator member and said actuator member through a restricted aperture, in a second position blocking said inlet from said actuator member and connecting said actuator member to exhaust, and in a third position blocking said exhaust from said actuator member and connecting said inlet to said actuator member;

(f) control means responsive to engine speed, vehicle speed and movement of said shift element and operative to move said valve member to said first position when either said engine oil pressure is above a certain value or said vehicle speed is above a certain value, to said second position when said gear shift element is moved, and to said third position when said engine oil pressure and vehicle speed are simultaneously below and above certain values respectively; and (g) an oil temperature responsive valve between said inlet and outlet such that changes in oil viscosity have no effect on the operation of said actuator member.

References Cited by the Examiner
UNITED STATES PATENTS

| | | | |
|---|---|---|---|
| 1,100,048 | 6/14 | Beck | 192—111 |
| 2,087,643 | 7/37 | Gillett | 192—3.5 |
| 2,208,865 | 7/40 | Gette | 192—.076 |
| 2,511,373 | 6/50 | Price | 192—91 |
| 2,688,388 | 9/54 | Gill | 192—.052 |
| 2,763,347 | 9/56 | Haubourdin | 192—.052 |

DAVID J. WILLIAMOWSKI, *Primary Examiner.*

UNITED STATES PATENT OFFICE
CERTIFICATE OF CORRECTION

Patent No. 3,177,993                                            April 13, 1965

Wilhelm Riehl

It is hereby certified that error appears in the above numbered patent requiring correction and that the said Letters Patent should read as corrected below.

Column 2, line 71, for "iff" read -- off --; column 3, line 74, for "curved" read -- curve --; column 5, line 38, for "for" read -- (for --; column 6, line 24, before "to" insert -- whereby the biasing action of said resilient means moves said actuator member --; column 8, line 3, strike out "for".

Signed and sealed this 21st day of September 1965.

(SEAL)
Attest:

ERNEST W. SWIDER
Attesting Officer

EDWARD J. BRENNER
                                               Commissioner of Patents